United States Patent
Fang et al.

(10) Patent No.: US 9,634,998 B2
(45) Date of Patent: Apr. 25, 2017

(54) ELECTRIC SYSTEM

(71) Applicant: E Ink Holdings Inc., Hsinchu (TW)

(72) Inventors: Kuo-Lung Fang, Taoyuan County (TW); Yao-Jen Hsieh, Taoyuan County (TW); Chi-Hsun Wang, Taoyuan County (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 14/457,123

(22) Filed: Aug. 12, 2014

(65) Prior Publication Data
US 2015/0110271 A1    Apr. 23, 2015

(30) Foreign Application Priority Data

Oct. 22, 2013  (TW) .............................. 102138152 A

(51) Int. Cl.
*H04L 29/06* (2006.01)
*H04W 12/02* (2009.01)
*H04W 4/00* (2009.01)

(52) U.S. Cl.
CPC ......... *H04L 63/0428* (2013.01); *H04W 12/02* (2013.01); *H04W 4/008* (2013.01)

(58) Field of Classification Search
CPC .... H04L 63/0428; H04W 12/02; H04W 4/008
USPC ........................................................ 380/270
See application file for complete search history.

(56) References Cited

U.S. PATENT DOCUMENTS

| | | | |
|---|---|---|---|
| 5,041,824 A | 8/1991 | DiSanto et al. | |
| 6,118,426 A | * 9/2000 | Albert | B41J 2/01 315/150 |
| 6,864,875 B2 | 3/2005 | Drzaic et al. | |
| 7,075,502 B1 | 7/2006 | Drzaic et al. | |
| 7,256,766 B2 | 8/2007 | Albert et al. | |

(Continued)

FOREIGN PATENT DOCUMENTS

| | | |
|---|---|---|
| CN | 101369828 | 2/2009 |
| TW | 200926785 | 6/2009 |

(Continued)

OTHER PUBLICATIONS

"Office Action of Taiwan Counterpart Application", issued on Apr. 13, 2015, p. 1-p. 7.

*Primary Examiner* — Robert Leung
*Assistant Examiner* — Thomas Ho
(74) *Attorney, Agent, or Firm* — Jianq Chyun IP Office

(57) ABSTRACT

An electric system including a first wireless apparatus, a display apparatus and a second wireless apparatus is provided. A first information is encrypted to be a first encrypted information and sent wirelessly by the first wireless apparatus. The display apparatus includes a display unit and a wireless communication unit electrically connected to the display unit. The wireless communication unit receives the first encrypted information and cause the display unit to display a first representative information corresponding to the first encrypted information. The first representative information and the first encrypted information are different. The second wireless apparatus reads the first encrypted information by the wireless communication unit, and the first encrypted information is decrypted to be the first encrypted information by the second wireless apparatus.

14 Claims, 2 Drawing Sheets

(56) References Cited

U.S. PATENT DOCUMENTS

| | | | |
|---|---|---|---|
| 7,429,984 B2* | 9/2008 | Sweeney | G06F 3/147 |
| | | | 345/211 |
| 7,492,505 B2 | 2/2009 | Liang et al. | |
| 7,821,702 B2 | 10/2010 | Liang et al. | |
| 8,159,636 B2 | 4/2012 | Sun et al. | |
| 2006/0290651 A1 | 12/2006 | Verhaegh et al. | |
| 2007/0159678 A1 | 7/2007 | Verhaegh et al. | |
| 2009/0108057 A1* | 4/2009 | Mu | H04M 1/72561 |
| | | | 235/375 |
| 2011/0022838 A1* | 1/2011 | Shaikh | H04L 63/0823 |
| | | | 713/156 |
| 2011/0040980 A1* | 2/2011 | Kerr | G06F 21/6245 |
| | | | 713/189 |
| 2011/0065385 A1 | 3/2011 | Geslin et al. | |
| 2011/0248909 A1 | 10/2011 | Sato | |
| 2011/0249043 A1 | 10/2011 | Sato | |
| 2012/0259635 A1* | 10/2012 | Ekchian | G06Q 50/18 |
| | | | 704/235 |
| 2013/0033735 A1 | 2/2013 | Noh et al. | |
| 2013/0271820 A1* | 10/2013 | Nakahara | G02F 1/167 |
| | | | 359/296 |
| 2016/0042602 A1* | 2/2016 | Phan | G07F 17/3237 |
| | | | 463/29 |

FOREIGN PATENT DOCUMENTS

| | | |
|---|---|---|
| TW | 201001295 | 1/2010 |
| TW | M389401 | 9/2010 |
| TW | 201118718 | 6/2011 |
| TW | I376067 | 11/2012 |
| TW | M456545 | 7/2013 |
| TW | 201342872 | 10/2013 |
| TW | M462920 | 10/2013 |

\* cited by examiner

ELECTRIC SYSTEM

CROSS-REFERENCE TO RELATED APPLICATION

This application claims the priority benefit of Taiwan application serial no. 102138152, filed on Oct. 22, 2013. The entirety of the above-mentioned patent application is hereby incorporated by reference herein and made a part of this specification.

BACKGROUND OF THE INVENTION

1. Field of the Invention

The invention relates to an electric system, and particularly relates to an electric system having wireless communication.

2. Description of Related Art

In recent years, demands of applying display apparatus in consumable products, such as electric note-messengers, e-signage, e-tags, e-books, smart cards and e-POP, etc. gradually increase, especially when wireless construction and digital technology are increasingly mature. Taking the electric note-messengers for example, the electric note-messengers allow the user to sufficiently communicate while reducing the use of papers. In this way, the goal of reducing carbon emissions is reached. However, with the conventional technologies, it is difficult to prevent irrelevant personnel from reading the contents displayed by the electric note-messenger when the users use the electric note-messenger, making the privacy of the users offended.

SUMMARY OF THE INVENTION

The invention provides an electric system capable of protecting privacy of users.

The electric system of the invention includes a first wireless apparatus, a display apparatus, and a second wireless apparatus. The first wireless apparatus encrypts a first information to be a first encrypted information and transmits the first encrypted information wirelessly. The display apparatus includes a display unit and a wireless communication unit electrically connected with the display unit. The wireless communication unit receives the first encrypted information and makes the display unit display the first representative information corresponding to the first encrypted information. The first representative information is different from the first information. The second wireless apparatus reads the first encrypted information through the wireless communication unit and decrypts the first encrypted information to be the first information.

In an embodiment of the invention, the first wireless apparatus transmits the first representative information to the wireless communication unit.

In an embodiment of the invention, the display apparatus further includes a processing unit electrically connected with the wireless communication unit and the display unit. The processing unit makes the display unit display the first representative information according to a source of the first encrypted information.

In an embodiment of the invention, the display apparatus further includes a storage unit storing the first encrypted information and the processing unit electrically connected with the storage unit and the wireless communication unit. Based on an authorization to the second wireless apparatus, the processing unit may make the second wireless apparatus able to read at least a portion of the first encrypted information corresponding to the authorization through the wireless communication unit.

In an embodiment of the invention, the second wireless apparatus encrypts the second information to be a second encrypted information and wirelessly transmits the second encrypted information. The wireless communication unit of the display apparatus receives the second encrypted information and makes the display unit display the second representative information corresponding to the second encrypted information. The second representative information is different from the second information. The first wireless apparatus reads the second encrypted information through the wireless communication unit and decrypts the second encrypted information to be the second information.

In an embodiment of the invention, the display apparatus further includes a driving unit electrically connected with the display unit. The first wireless apparatus or the second wireless apparatus transmits a wireless energy. The driving unit drives the display unit with the wireless energy.

In an embodiment of the invention, the display apparatus further includes a substrate between the display unit and the wireless communication unit.

In an embodiment of the invention, the display apparatus further includes at least one conductive component. The substrate has at least one through-hole. The conductive component is disposed in the through hole. The wireless communication unit may be electrically connected with the display unit through the conductive component.

In an embodiment of the invention, the display apparatus further includes a fixing component connected with the display unit.

In an embodiment of the invention, the display unit is an electrophoretic display unit or an electrowetting display unit.

Based on the above, in the electric system according to an embodiment of the invention, the first wireless apparatus makes the display apparatus display the unimportant representative information instead of the information intended to be encrypted, and the second wireless apparatus reads the encrypted information through the display apparatus and decrypts the encrypted information, so as to access the information intended to be encrypted. Therefore, the user of the electric system according to an embodiment of the invention may transmit the information intended to be encrypted to another user in a highly encrypted condition.

To make the above features and advantages of the invention more comprehensible, embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
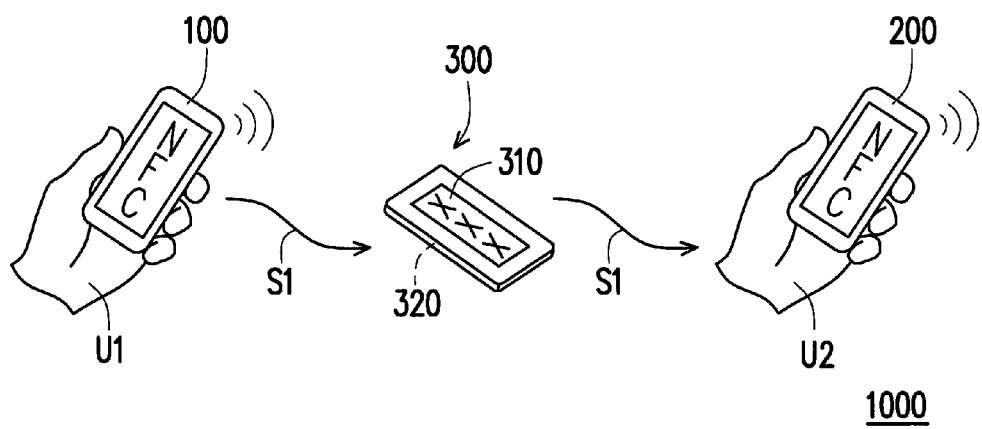
FIG. 1 is a schematic view of an electric system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic view of an electric system according to an embodiment of the invention. Referring to FIG. 1, an electric system 1000 of this embodiment includes a first wireless apparatus 100, a second wireless apparatus 200, and a display apparatus 300. The first wireless apparatus 100 encrypts a first information NFC to be a first encrypted information S1 and transmits the first encrypted information S1 wirelessly. The display apparatus 300 includes a display unit 310 and a wireless communication unit 320 electrically connected with the display unit 310. The wireless communication unit 320 receives the first encrypted information S1 and makes the display unit 310 display a first representative information XXX corresponding to the first encrypted information. In addition, the first representative information XXX is different from the first information NFC. The second wireless apparatus 200 reads the first encrypted information S1 through the wireless communication unit 320 and decrypts the first encrypted information S1 to be the first information NFC. In this embodiment, the first wireless apparatus 100 and the second wireless apparatus 200 may be a near field communication (NFC) wireless apparatus, a radio-frequency (RF) wireless apparatus, a Bluetooth wireless apparatus or other suitable wireless apparatus.

In this embodiment, users U1 and U2 may use the display apparatus 300 of the electric system 1000 as an electric note-messenger, and the electric system 1000 provides the users U1 and U2 with privacy when using the electric note-messenger. Specifically speaking, the first wireless apparatus 100 and the second wireless apparatus 200 of this embodiment are a mobile phone, for example. The user U1 may input the first information NFC intended to be transmitted to the user U2 by using the first wireless apparatus 100. Subsequently, the user U1 may use the first wireless apparatus 100 to encrypt the first information NFC to be the first encrypted information S1 and transmit the first encrypted information S1 to the electric note-messenger (i.e. the display apparatus 300). The wireless communication unit 320 of the electric note-messenger may make the display unit 310 display the first representative information XXX that is different from the first information NFC after receiving the first encrypted information S1. The first representative information may be text or a picture, such as the name or picture of the user U1, for example. When the user U2 notices the first representative information XXX displayed by the electric note-messenger, the user U2 may use the second wireless apparatus 200 to read the first encrypted information S1 by using the second wireless apparatus 200 and use the second wireless apparatus 200 to decrypt the first encrypted information S1, so as to read the first information NFC that the user U1 intends to transmit.

It should be noted that since the electric note-messenger does not directly display the first information NFC that the users U1 and U2 intend to encrypt during a communication process of the users U1 and U2, the privacy of the users U1 and U2 is protected.

Figure 2:
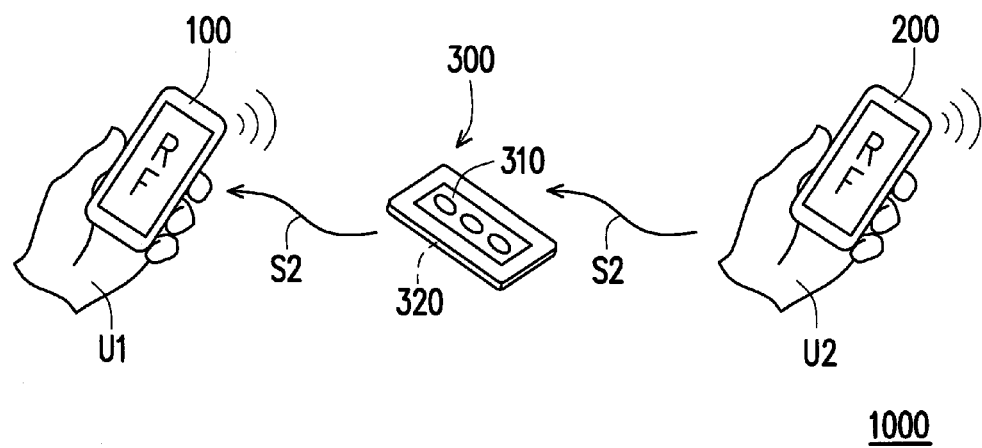
FIG. 2 illustrates that an user transmits an information to another user through an electric system according to an embodiment of the invention.

In this embodiment, the user U2 may also transmit an information in a way similar to that of the user U1. FIG. 2 illustrates that an user transmits an information to another user through an electric system according to an embodiment of the invention. Referring to FIG. 2, in this embodiment, the user U2 may also input an information to the display apparatus 300 like the user U1, so as to transmit the information to the user U1. More specifically, the user U2 may input a second information RF to the second wireless apparatus 200 and uses the second wireless apparatus 200 to encrypt the second information RF to be a second encrypted information S2 and wirelessly transmit the second encrypted information S2. The wireless communication unit 320 of the display apparatus 300 receives the second encrypted information S2 and makes the display unit 310 display a second representative information OOO corresponding to the second encrypted information S2. In addition, the second representative information OOO is different from the second information RF. The user U1 may use the first wireless apparatus 100 to read the second encrypted information S2 through the wireless communication unit 320 of the display apparatus 300 and decrypt the second encrypted information S2 to be the second information RF.

Figure 3:
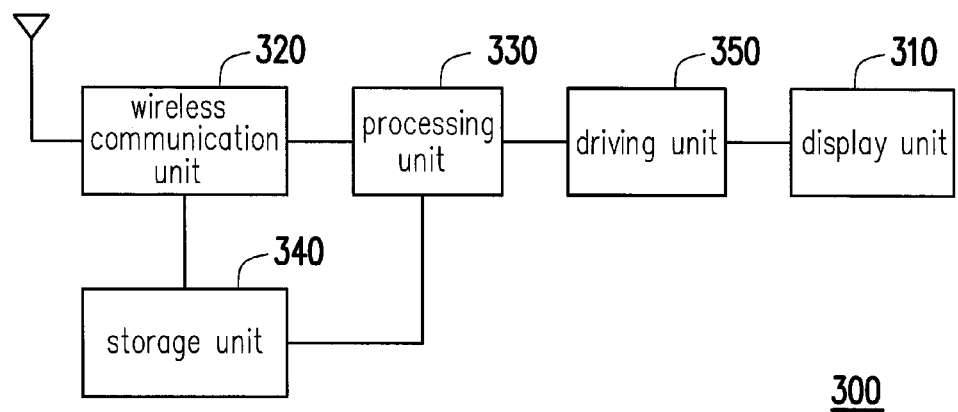
FIG. 3 is a schematic circuit block view of a display apparatus according to an embodiment of the invention.

Referring to FIG. 1 again, in this embodiment, the first wireless apparatus 100 may transmit the first representative information XXX to the wireless communication unit 320 of the display apparatus 300, so as to make the display unit 310 display the first representative information XXX. In other words, content of the first representative information XXX may be manually determined by the user U1 operating the first wireless apparatus 100. However, the invention is not limited thereto. In other embodiments, the content of the first representative information XXX may be automatically determined. Details in this respect are specifically described hereinafter with reference to FIG. 3. FIG. 3 is a schematic circuit block view of a display apparatus according to an embodiment of the invention. Referring to FIGS. 1 and 3, the display apparatus 300 further includes a processing unit 330 electrically connected with the wireless communication unit 320 and the display unit 310. The processing unit 330 may automatically make the display unit 310 display the first representative information XXX according to a source of the first encrypted information S1.

The display apparatus 300 of this embodiment further includes a storage unit 340 capable of storing the first encrypted information S1 and the processing unit 330 electrically connected with the storage unit 340 and the wireless communication unit 320. Based on an authorization to the second wireless apparatus 200, the processing unit 330 may make the second wireless apparatus 200 able to read at least a portion of the first encrypted information S1 corresponding to the authorization through the wireless communication unit 320. For example, in addition to serving as the electric note-messenger, the display apparatus 300 of this embodiment may serve as an electronic tag (e-tag) as well. The user U1 (as a vendor, for example) may save all information of a product (i.e. the first encrypted information S1) corresponding to the e-tag into the storage unit 340 of the e-tag, and set in the processing unit 330 an authorization of a range of the first encrypted information S1 that the user U2 (as a buyer, for example) is accessible to read. In this way, when the user U2 (as a buyer, for example) intends to further understand an information about the product nearby the e-tag, the user U2 may read the accessible product information authorized by the user U1 (as a vendor, for example) by using the second wireless apparatus 200.

It should be noted that the invention does not intend to impose a limitation on the use of the electric system of the invention. In addition to serving as the electric note-messenger and e-tag, the display apparatus 300 may also serve as an electronic warranty card or other products. Taking the electronic warranty card for example, the user U1 (as a vendor, for example) may save an information of a product (e.g. date of purchase, warranty period, specification of the product, and maintenance manual of the product) corresponding to the electronic warranty card into the storage unit 340 of the electronic warranty card in a form of the first encrypted information S1. The user U1 (as a vendor, for example) may use the processing unit 330 to limit the user U2 (as a buyer, for example) on modifying the first encrypted information S1, so as to prevent the user U2 (as a buyer, for example) from making an arbitrary modification. When the product corresponding to the electronic warranty card later needs maintenance, the user U1 (as a vendor, for example) may retrieve the information of the sold product through the electronic warranty card and take a suitable action. For example, the user U1 (as a vendor, for example) may decide whether the user U2 needs to pay based on the date of purchase and warranty period, or conduct maintenance with reference to the maintenance manual of the product.

Referring to FIG. 3, the display apparatus 300 of this embodiment further includes a driving unit 350 electrically connected with the display unit 310. The driving unit 350 may utilize the first wireless apparatus 100 or the second wireless apparatus 200 to transmit a wireless energy (such as a wireless electromagnetic wave energy for providing power) to drive the display unit 310. In other words, the display apparatus 300 of this embodiment may be a battery-free wireless display apparatus.

Figure 4:
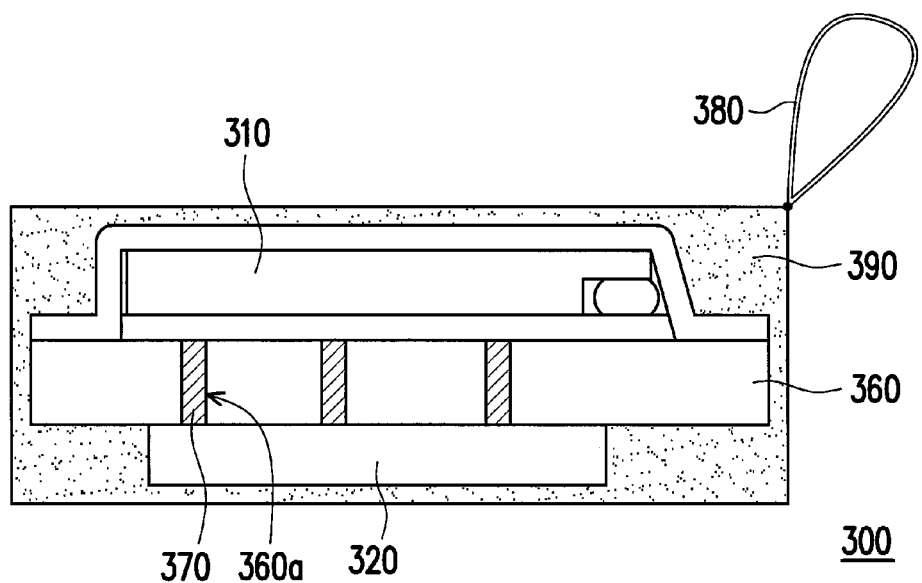
FIG. 4 is a schematic cross-sectional view of a display apparatus according to an embodiment of the invention.

FIG. 4 is a schematic cross-sectional view of a display apparatus according to an embodiment of the invention. Referring to FIG. 4, the display apparatus 300 of this embodiment further includes a substrate 360. The display unit 310 and the wireless communication unit 320 may be respectively located at two opposite surfaces of the substrate 360. In other words, the substrate 360 may be located between the display unit 310 and the wireless communication unit 320. The substrate 360 has at least one through-hole 360a. The display apparatus 300 further includes at least one conductive component 370. The conductive component 370 is disposed in the through-hole 360a. The wireless communication unit 320 may be electrically connected with the display unit 310 through the conductive component 370.

In this embodiment, the display unit 310 may be an electrophoretic display unit, an electrowetting display unit, or other suitable bistable display units. The display apparatus 300 further includes a fixing component 380 connected with the display unit 310. Specifically speaking, the display apparatus 300 further includes a housing 390 covering the display unit 310, the wireless communication unit 320 and the substrate 360. The fixing component 380 may be connected with the display unit 310 through the housing 390. By using the fixing component 380, the display apparatus 300 may be fixed on an arbitrary object (e.g. wall, backpack, hand, clothes, table, or mobile phone, etc.) for the user to use conveniently. The fixing component 380 may be a hook, an adhering component, a pin, a kit, a sucking disc, or fixing components in other forms.

In view of the foregoing, in the electric system according to an embodiment of the invention, the first wireless apparatus makes the display apparatus display the unimportant representative information instead of the information intended to be encrypted, and the second wireless apparatus reads the encrypted information through the display apparatus and decrypts the encrypted information, so as to access the information intended to be encrypted. Therefore, the user of the electric system according to an embodiment of the invention may privately transmit the information intended to be encrypted to another user in a highly encrypted condition.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electric system, comprising:
a first wireless apparatus, encrypting a first information to be a first encrypted information and wirelessly transmitting the first encrypted information;
a display apparatus, comprising:
a display unit;
a wireless communication unit, electrically connected with the display unit, wherein the wireless communication unit receives the first encrypted information;
a substrate, located between the display unit and the wireless communication unit;
at least one conductive component, wherein the substrate has at least one through-hole, the conductive component is configured in the through-hole, and the wireless communication unit is electrically connected with the display unit through the conductive component; and
a processing unit electrically connected with the wireless communication unit and the display unit, and making the display unit display a first representative information corresponding to the first encrypted information, wherein the first representative information comprises a text or a picture related to a user of the first wireless apparatus, and the first representative information is different from the first information; and
a second wireless apparatus, the processing unit making the second wireless apparatus read the first encrypted information through the wireless communication unit based on an authorization to the second wireless apparatus and the second wireless apparatus decrypting the first encrypted information to be the first information to make a user of the second wireless apparatus read the first information through the second wireless apparatus,
wherein the second wireless apparatus encrypts a second information to be a second encrypted information and wirelessly transmits the second encrypted information,
the wireless communication unit of the display apparatus receives the second encrypted information and the processing unit of the display apparatus makes the display unit display a second representative information corresponding to the second encrypted information,
the second representative information comprises a text or a picture related to the user of the second wireless apparatus;
the second representative information is different from the second information, and
the first wireless apparatus reads the second encrypted information through the wireless communication unit and decrypts the second encrypted information to be the second information to make the user of the first wireless apparatus read the second information through the first wireless apparatus.

2. The electric system as claimed in claim 1, wherein the first wireless apparatus transmits the first representative information to the wireless communication unit.

3. The electric system as claimed in claim 1, wherein the processing unit makes the display unit display the first representative information according to a source of the first encrypted information.

4. The electric system as claimed in claim 1, wherein the display apparatus further comprises:
   a storage unit, storing the first encrypted information; and
   wherein based on the authorization to the second wireless apparatus, the processing unit makes the second wireless apparatus read at least a portion of the first encrypted information corresponding to the authorization through the wireless communication unit.

5. The electric system as claimed in claim 1, wherein the display apparatus further comprises:
   a driving unit, electrically connected with the display unit, wherein the first wireless apparatus or the second wireless apparatus transmits a wireless energy, and the driving unit drives the display unit with the wireless energy.

6. The electric system as claimed in claim 1, wherein the display apparatus further comprises a fixing component connected with the display unit.

7. The electric system as claimed in claim 1, wherein the display unit is an electrophoretic display unit or an electrowetting display unit.

8. An electric system, comprising:
   a first wireless apparatus, encrypting a first information to be a first encrypted information and wirelessly transmitting the first encrypted information;
   a display apparatus, comprising:
     a display unit;
     a wireless communication unit, electrically connected with the display unit, wherein the wireless communication unit receives the first encrypted information;
     a processing unit electrically connected with the wireless communication unit and the display unit, and making the display unit display a first representative information corresponding to the first encrypted information, the first representative information comprises a text or a picture related to a user of the first wireless apparatus, and the first representative information is different from the first information;
     a substrate, located between the display unit and the wireless communication unit;
     a fixing component connected with the display unit;
     at least one conductive component, wherein the substrate has at least one through-hole, the conductive component is configured in the through-hole, and the wireless communication unit is electrically connected with the display unit through the conductive component; and
     a housing covering the display unit, the wireless communication unit and the substrate, wherein the fixing component connects with the display unit through the housing; and
   a second wireless apparatus, the processing unit making the second wireless apparatus read the first encrypted information through the wireless communication unit and the second wireless apparatus decrypting the first encrypted information to be the first information.

9. The electric system as claimed in claim 8, wherein the first wireless apparatus transmits the first representative information to the wireless communication unit.

10. The electric system as claimed in claim 8, wherein the processing unit makes the display unit display the first representative information according to a source of the first encrypted information.

11. The electric system as claimed in claim 8, wherein the display apparatus further comprises:
    a storage unit, storing the first encrypted information; and
    wherein based on an authorization to the second wireless apparatus, the processing unit makes the second wireless apparatus read at least a portion of the first encrypted information corresponding to the authorization through the wireless communication unit.

12. The electric system as claimed in claim 8, wherein the second wireless apparatus encrypts a second information to be a second encrypted information and wirelessly transmits the second encrypted information, the wireless communication unit of the display apparatus receives the second encrypted information and the processing unit of the display apparatus makes the display unit display a second representative information corresponding to the second encrypted information, the second representative information comprises a text or a picture related to a user of the second wireless apparatus, the second representative information being different from the second information, and the first wireless apparatus reads the second encrypted information through the wireless communication unit and decrypts the second encrypted information to be the second information.

13. The electric system as claimed in claim 8, wherein the display apparatus further comprises:
    a driving unit, electrically connected with the display unit, wherein the first wireless apparatus or the second wireless apparatus transmits a wireless energy, and the driving unit drives the display unit with the wireless energy.

14. The electric system as claimed in claim 8, wherein the display unit is an electrophoretic display unit or an electrowetting display unit.

* * * * *